No. 872,383.

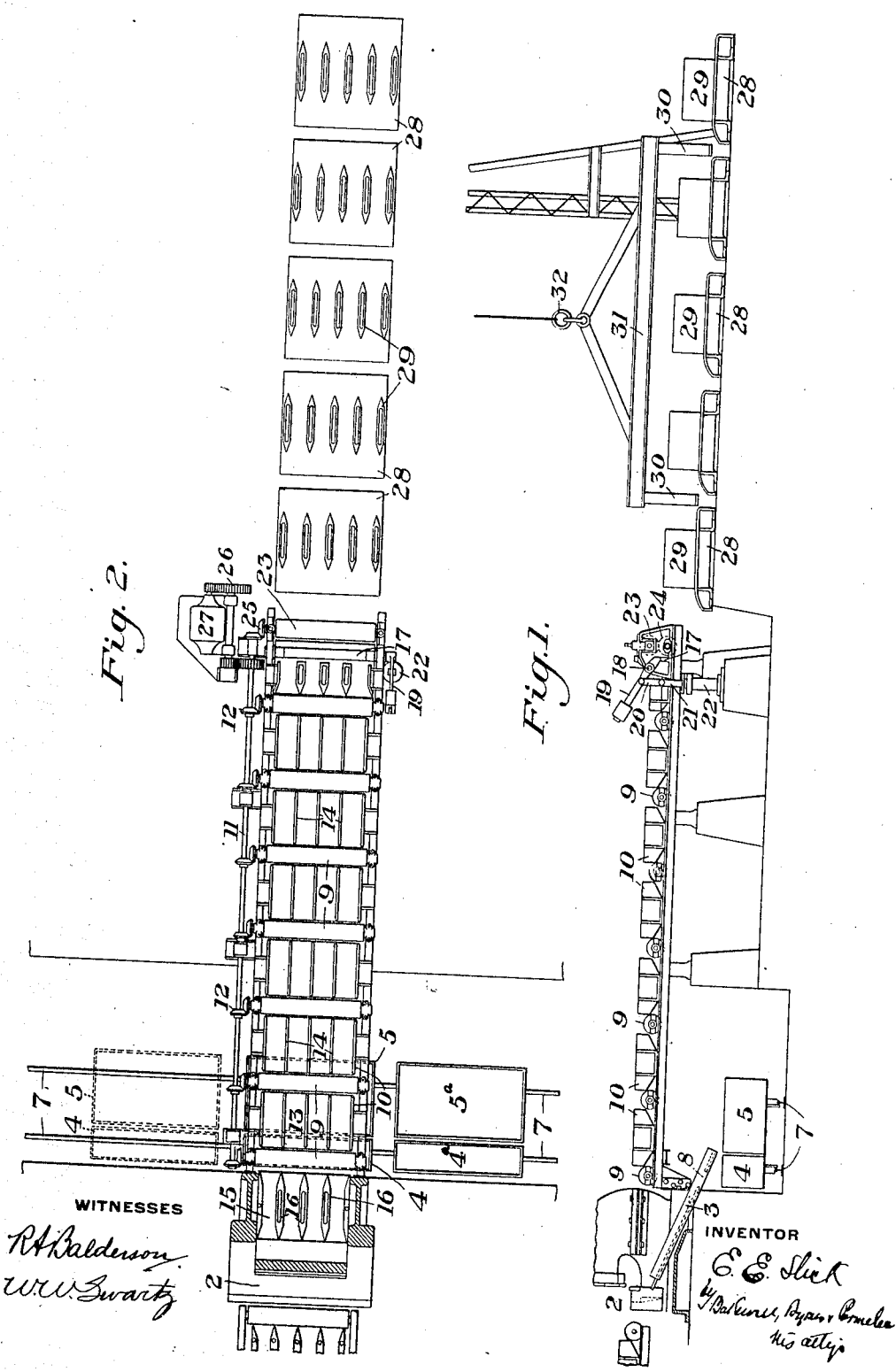

PATENTED DEC. 3, 1907.

E. E. SLICK.
BAR HANDLING APPARATUS.
APPLICATION FILED JUNE 5, 1907.

2 SHEETS—SHEET 2.

WITNESSES
R A Balderson
W W Swartz

INVENTOR
E. E. Slick
by Bakewell, Byrnes and Parmelee
his attys

UNITED STATES PATENT OFFICE.

EDWIN E. SLICK, OF PITTSBURG, PENNSYLVANIA.

BAR-HANDLING APPARATUS.

No. 872,383.  Specification of Letters Patent.  Patented Dec. 3, 1907.

Application filed June 5, 1907. Serial No. 377,334.

*To all whom it may concern:*

Be it known that I, EDWIN E. SLICK, of Pittsburg, Allegheny county, Pennsylvania, have invented a new and useful Bar-Handling Apparatus, of which the following is a full, clear, and exact description, reference being had to the accompanying drawings, forming part of this specification, in which—

Figure 3:
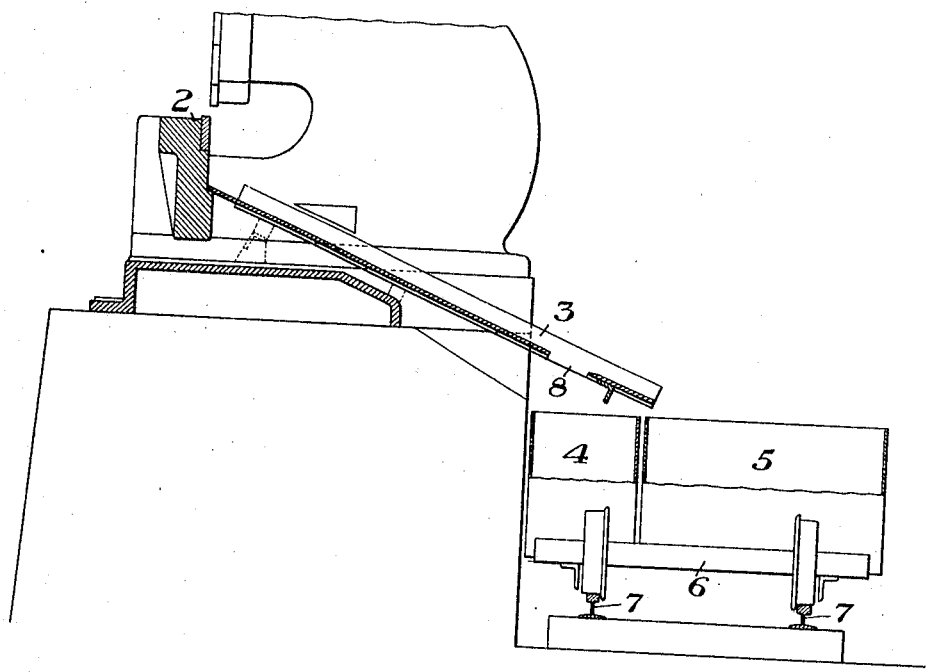
Figure 4:
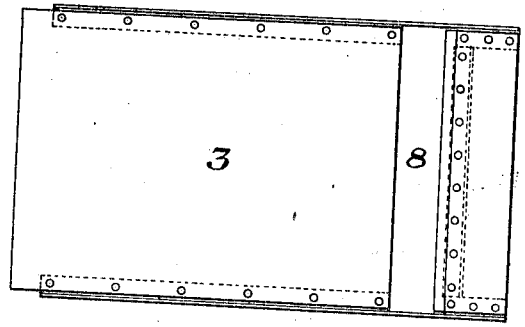

Figure 1 is a side elevation partly in section showing one form of my improved apparatus; Fig. 2 is a top plan view of the same; and Figs. 3 and 4 are detail views of the scrap chute and scrap car.

My invention relates to the handling of metal bars, strips &c., such as tin bar and skelp.

The object of the invention is to provide a simple and cheap apparatus for handling the scrap ends and piling and removing the bars.

In the drawings, 2 represents the lower shear blade of a shear having a feed-out chute 3 for the crop-ends. This chute 3 discharges into two receptacles 4 and 5 mounted upon each of the wheeled trucks or cars traveling upon track 7. The lower end portion of the chute is slotted as shown at 8, this slot extending across the chute floor and being positioned over the receptacle 4. As the cut-off ends slide down the chute, crop-ends and pieces of short and unmarketable length will drop through the slot 8 into the receptacle 4. Those ends which are of sufficient length to be marketable will bridge the slot 8 and drop from the end of the chute into the receptacle 5. When the boxes 4 and 5 become filled with crop-ends and short bars or plates, the trucks carrying the boxes are shifted on the track 7 until the boxes 4ª, 5ª are beneath the chute 3 and the boxes 4, 5 are in the position shown by dotted lines, where they can be easily picked up from cars and trucks by the overhead crane and emptied or deposited at any desired point, and empty boxes can be replaced upon the car or truck. When the receptacles 4ª, 5ª become filled the cars are then shifted in the opposite direction, thus bringing the filled boxes into position to be removed by the crane and at the same time shifting the empty boxes on the other car into position beneath the chute 3. The sheared-off bar lies during the shearing operation upon the shear table. I have shown this table as comprising rollers 9 with side guides 10 between them, the rollers being driven from the line shaft 11 through bevel gears 12.

In order to provide for simultaneous shearing of two or more bars, and also to provide for taking up several piles of bars, to give the crane a proper load, I preferably provide vertically extending separators which divide the skelp or bars on the shear table. Thus, the apron plates 13 between the rollers 9 are shown as provided with vertically extending separators 14; and the fore plate 15 of the shear is also provided with similar separator ribs 16.

At the outer end of the shear table is placed a stop 17, which I have shown as pivoted to the rock shaft 18, having a counter-weighted rock arm 19 connected by the pivotal link 20 with the piston or plunger 21 of a vertical hydraulic cylinder 22. By actuating this cylinder the stop may be raised or lowered to either hold the bars on the shear table, or allow them to be fed forward to and between the pinch rolls 23 and 24. The upper pinch roll is preferably spring-pressed downwardly, and the lower roll may be driven by bevel gear connections 25 leading to the shaft 11 which is driven through slow-motion gearing connections 26 to an electric motor 27. This motor is provided with the usual controller by which the pinch rolls and table rollers may be driven at the proper times.

At the end of and in line with the shear table is the metal piler. I have shown this as consisting of a series of bed plates or castings 28, which are arranged endwise in a row, each being provided with the vertically extending partitions 29 which divide the skelp or bars into four piles. The bed plates or castings are spaced apart at their adjacent ends, and in these spaces are located the lifter bars 30 carried on horizontal support 31, which may be lifted by a crane attached to ring 32. This crane may be of the ordinary traveling or jib type.

In using the apparatus, the skelp or bars are fed forwardly from the mill between shear blades and upon the shear table. The front end of the bars are first cropped, these crop-ends sliding down the chute 3 and dropping through the slot 8 into the box 4. The bars are then fed forward until they strike the stop at the extreme end of the shear table. Two or more plates may be fed forward in the different positions, and these may be sheared simultaneously. The rear ends of the plates or bars are then sheared and the ends drop down the chute, and are fed automatically into either the receptacle 4 or the receptacle 5, thus selecting them either for recharging or for sale. After cutting off, the cylinder is actuated to lift the stop, the motor 27 is energized, and the table rollers feed the skelp or bars forwardly into the pinch rollers 23, 24, which feed them forward and drop them upon the piler supports. Each bar or set of bars passing through the pinch rolls will drop upon the next preceding bar or set of bars in the piler, until the desired number of bars are piled. A crane may then be connected to the lifter, and the several piles of skelp or bars may be lifted and taken to the desired point.

The advantages of my invention result from the selective action of the scrap chute, from the peculiar arrangement of the stop, and pinch rolls, and also the arrangement of the separators for producing several piles of the bars or skelp side by side. By the use of two or more cars carrying the receptacles 4, 5 on the depressed track 7, the scrap receptacles are always in position beneath the chute to receive the sheared ends. The filled scrap receptacles are easily and quickly removed from the cars by means of the overhead crane, which deposits the boxes or unloads them at any point within range of the crane.

Many changes may be made in the form and arrangement of the shears, tables and pinch rolls, &c., without departing from my invention.

I claim:—

1. In bar handling apparatus, a shear having a table in front thereof, a feed chute below said table, said chute having a slot or opening adapted to select the shorter pieces and divide them into two piles; substantially as described.

2. The combination with a shear having a feed table in front thereof, of a chute leading from said shear below said table, a car having receptacles into which the chute discharges, and a slot or opening in the chute arranged to separate the shorter pieces and drop them into one of the receptacles; substantially as described.

3. In metal handling apparatus, a shear having a shear table with vertical partitions or separators arranged to separate the bars or skelp lying side by side; substantially as described.

4. A shear table having rollers with driving connections and apron plates between the rollers having separators extending at right angles to the roller axes; substantially as described.

5. The combination with a roller table, a pair of pinch rollers at one end thereof and arranged to feed metal from said roller table, of a motor for simultaneously driving said roller table and pinch rolls; substantially as described.

6. A roller feed table, a pinch roller system at one end thereof and a movable stop between the pinch rolls and the rollers of the feed table; substantially as described.

7. A roller feed table, a pinch roller system at one end of the table, connections for driving the table rollers and pinch rolls, and an electric motor for driving the table rollers and pinch rolls, said motor being arranged to rotate said pinch rolls and feed rollers in both directions, substantially as described.

8. A shear table having a pinch roll system at one end thereof, a piler in front of said table into which the pinch rolls discharge, and lifting apparatus arranged to remove the material on said pilers, substantially as described.

9. The combination with a shear and a shear table in line with and in front of said shear, a stop at the outer end of said shear table, a piler extending in front of the pinch rolls, and lifting mechanism for removing the material placed on said piler, substantially as described.

10. The combination with a shear and a shear table in line with and in front of said shear, of a pinch roll system at the outer end of said table, a stop between the pinch rolls and the shear table and a piler extending in front of the pinch rolls, the level of said piler being below that of the roller table; substantially as described.

11. Bar handling apparatus comprising a shear having a chute leading therefrom, a feed table in front of and above the chute, a track extending on both sides of the chute from beneath said chute, and cars on said track arranged to be alternately placed in position through opposite sides of the chute to receive materials discharged from said chute; substantially as described.

12. Bar handling apparatus comprising a shear having a chute leading therefrom, a feed table in front of and above the chute, a track extending transversely in front of said chute, and cars on said track having removable boxes thereon and arranged to be alternately placed in position from opposite sides of the chute to receive materials discharged from said chute; substantially as described.

13. Bar handling apparatus comprising a shear having a chute leading therefrom, a feed table in front of and above said chute, a track extending transversely from beneath said chute having cars thereon, a crane above said track, said cars being arranged to be alternately placed in position to receive materials discharged from said chute and in position on opposite sides of the chute for said crane to remove the materials from said cars; substantially as described.

14. Bar handling apparatus comprising a shear having a chute leading therefrom, a feed table in front of and above said chute, a track extending from beneath said chute having cars thereon, a crane above said track, said cars having removable boxes thereon and being arranged to be alternately placed in position to receive materials discharged from said chute and in position for said crane to remove and replace the boxes on said cars; substantially as described.

In testimony whereof, I have hereunto set my hand.

EDWIN E. SLICK.

Witnesses:
LAURENCE H. LEE,
H. M. CORWIN.